(12) United States Patent
Mack et al.

(10) Patent No.: US 6,308,493 B1
(45) Date of Patent: Oct. 30, 2001

(54) FILM WRAPPING MACHINE CONTROL SYSTEM AND METHOD (76) Inventors: Daniel P. Mack, 611 Legend Hills, Cincinnati, OH (US) 45255; Donald R. Diekman, 4515 Forest Haven La., Batavia, OH (US) 45103

( * ) Notice: Subject to any disclaimer, the term of this patent is extended or adjusted under 35 U.S.C. 154(b) by 0 days.

(21) Appl. No.: 09/088,285

(22) Filed: Jun. 2, 1998

(Under 37 CFR 1.47)

Related U.S. Application Data (60) Provisional application No. 60/048,302, filed on Jun. 2, 1997.

(51) Int. Cl.[7] .............................. B65B 9/06; B65B 57/00
(52) U.S. Cl. ................................. 53/75; 53/463; 53/504; 53/450; 53/550
(58) Field of Search ................................. 53/75, 504, 503, 53/450, 550, 553, 555, 463, 461, 466, 591, 586, 582, 228

(56) References Cited

U.S. PATENT DOCUMENTS 4,658,569 * 4/1987 Hanagata ................................. 53/550
5,147,491 * 9/1992 Thomas et al. ....................... 53/75 X
5,289,671 * 3/1994 Lerner et al. ........................ 53/75 X
5,329,745 * 7/1994 Suga ........................................ 53/75
5,475,964 * 12/1995 Flesser et al. ........................... 53/75

* cited by examiner

Primary Examiner—James F. Coan
(74) Attorney, Agent, or Firm—Thomas A. Boshimski (57) ABSTRACT A control system and control method for use in a machine for wrapping an article in plastic film are disclosed, the machine including a sealing head and a corresponding anvil movable by a pneumatic cylinder from an initial separated position to a contact position. The cylinder has an air exhaust outlet for exhausting air from the cylinder during operation of the cylinder from its initial state to an actuated state. A selectively actuatable valve disposed in the outlet selectively directs exhausting air through a first path of relatively low airflow resistance and a second path of relatively high airflow resistance. The valve directs exhaust air flow from the first path into the second path during operation of the cylinder and just prior to the cylinder being placed in the actuated state to cushion contact between the head and anvil.

12 Claims, 5 Drawing Sheets

FILM WRAPPING MACHINE CONTROL SYSTEM AND METHOD

This application claims the benefit of U.S. Provisional Application Ser. No. 60/048,302, filed Jun. 2, 1997.

BACKGROUND OF THE INVENTION

The present invention relates generally to a packaging machine, and more particularly to a packaging machine in which articles to be packaged are wrapped in heat-shrinkable plastic film. More specifically, the present invention relates to a system and a method for controlling the film cutting and sealing operation of such a machine.

Packaging machines which wrap articles in heat-shrinkable plastic film are well-known. One example of a machine of this general type can be seen in U.S. Pat. No. 4,658,569. A web of film is provided in which the film is folded to form a two-ply web having a fold connecting the layers along one edge of the web. The web is drawn from the roll, and turned through 90° to form an open cavity within the web into which the article to be packaged is introduced. The film and article are together advanced beyond a sealing station. At the sealing station, a cooperating cutting/sealing head and anvil are positioned for vertical movement to bring the sealing/cutting head into contact with the anvil and to subsequently separate them. The head is heated, and the contact is made with the web located between the head and anvil. This causes the web to be both severed and sealed at the sealing station. Vertical movement of the sealing apparatus usually encompasses movement of both the sealing/cutting head and the anvil toward and away from each other, the movement typically being caused by one or more pneumatic cylinders.

Other machine operations seal the film along the unfolded side edge of the web, producing an article which is encased in the film. The sealed package is then moved into a heated shrink tunnel which causes the film to shrink so as to closely conform to the packaged article.

With regard to the lateral seal formed at the sealing station, it has generally been found that the seal should be positioned at the mid-point of the article height so that the upper and lower film layers are fitted around the article in a generally symmetrical manner. In one known machine of this type, this can be accomplished by moving the entire sealing head/anvil/pneumatic cylinder assembly up or down to properly position the meeting point between the sealing/cutting head and anvil which continue to be moved the full stroke of the cylinders.

It is desirable to minimize the time required for the sealing operation in order to enhance the overall speed of the process, especially when long continuous runs are made. One way to achieve this is to reduce the time required for the sealing head and anvil to complete their downward/upward travel for each cycle. This can be done, for packages which are of less than maximum acceptable height, by mechanically holding the anvil at its position below the plane of the conveyor system, while lowering the cutting/sealing head. This reduces the up/down stroke distance for each cycle, and also satisfies the desire to position the resulting seal along the mid-point of the package height.

However, this in turn creates a problem because the seal head speed and cushioning cannot be controlled by conventional methods. In conventional machines in which the seal head executes its full stroke for all package heights, the speed of the seal head is slowed (cushioned) just prior to contact with the anvil to provide smooth yet firm sealing pressure. This is accomplished through the conventional construction of the pneumatic cylinder itself, which pneumatically slows cylinder piston movement near the full limit of either direction of stroke. However, this method is not usable for less than the full stroke of the cylinder.

Slowing of the cutting/sealing head and anvil just prior to meeting is desirable. Otherwise, the full-speed "crashing" of the cutting/sealing head into the anvil can cause premature wearing of the cutting knife, as well as poor sealing quality due to "bounce" of the sealing mechanisms. Since many articles to be packaged on a machine can be expected to be less than the maximum article size accepted by the machine, a need exists for a control system for the cutting and sealing operation that permits high speed operation of the sealing station even when the articles to be packaged are of less than full height.

SUMMARY OF THE INVENTION

The present invention provides a control system for use in a machine for wrapping an article in plastic film, including a sealing station having a sealing head and a corresponding anvil, and means for moving the head and anvil from an initial separated position to a contact position and back to the initial position. The moving means includes a pneumatic cylinder having an initial state in which the head and anvil are in the initial position and an actuated state in which the head and anvil are in the contact position. The cylinder has an air exhaust outlet line for exhausting air from the cylinder during operation of the cylinder from the initial state to the actuated state.

An adjustment means is provided for adjusting the initial position to move the head and anvil closer together while in the initial position. A selectively actuatable valve disposed in the outlet line selectively directs exhausting air through a first path including relatively low airflow resistance and a second path including relatively high airflow resistance. Means is provided for controlling the valve to direct exhaust air flow from the first path into the second path during operation of the cylinder and just prior to the cylinder being placed in the actuated state to cushion contact between the head and anvil.

The means for controlling the valve may include a microprocessor programmed to control the valve to direct exhaust air flow from the first path into the second path just prior to the mutual contact between the head and the anvil. The microprocessor controls the valve to direct exhaust air flow from the first path into the second path after a predetermined time interval during operation of the cylinder.

A memory may be included for storing the predetermined time interval, and wherein the microprocessor reads the predetermined time interval from the memory. The memory may store a plurality of the predetermined time intervals, in which case the microprocessor reads an appropriate one of the predetermined time intervals as a function of distance between the head and the anvil when the cylinder is in the initial state.

The present invention also includes a method for controlling a machine for wrapping an article in plastic film. The machine includes a sealing station having a sealing head and a corresponding anvil, and means for moving the head and anvil from an initial separated position to a contact position and back to the initial position, the moving means including a pneumatic cylinder having an initial state in which the head and anvil are in the initial position and an actuated state in which the head and anvil are in the contact position, the cylinder having an air exhaust outlet line for exhausting air from the cylinder during operation of the cylinder from the initial state to the actuated state, and a selectively actuatable valve disposed in the outlet line for selectively directing exhausting air through a first path including relatively low airflow resistance and a second path including relatively high airflow resistance.

The control method comprises operating the cylinder to move from the initial state into the actuated state, and controlling the valve to direct exhaust air flow from the first path into the second path during operation of the cylinder just prior to the cylinder being placed in the actuated state to cushion contact between the head and the anvil.

The method may further comprise the step of adjusting the initial position to move the head and the anvil to change the distance therebetween while the cylinder is in the initial state. The valve may be controlled to direct exhaust air flow from the first path into the second path after a predetermined time interval during operation of the cylinder. The machine may include a memory for storing the predetermined time interval, in which case the predetermined time interval is read from the memory. The memory may also store a plurality of the predetermined time intervals, wherein an appropriate one of the predetermined time intervals is read as a function of distance between the head and the anvil when the cylinder is in the initial state.

In the method, following adjusting of the initial position, the distance between the head and the anvil may be determined by controlling the valve to direct exhaust air flow from the first path into the second path, thereafter operating the cylinder from the initial state to the actuated state to cause contact between the head and the anvil, and measuring the time required for the operation of the cylinder.

DETAILED DESCRIPTION OF THE PREFERRED EMBODIMENT

Figure 1:
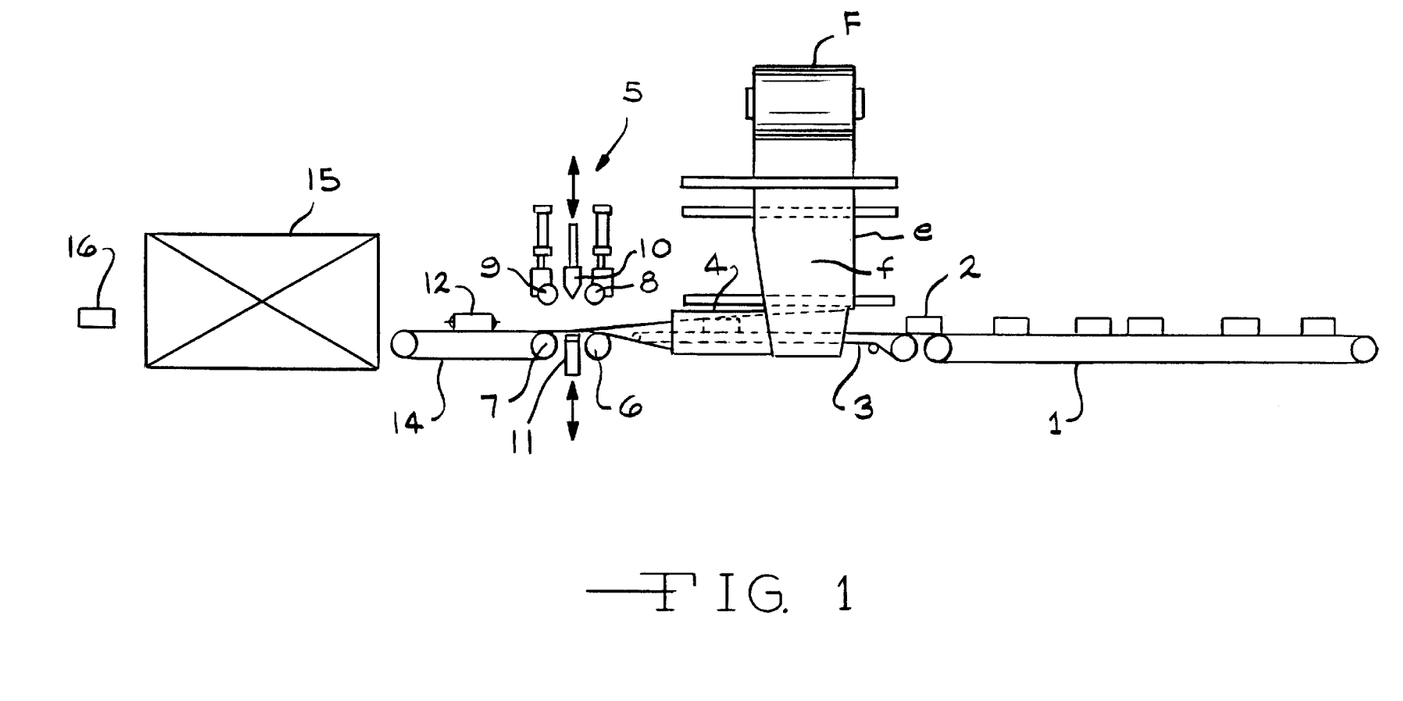
FIG. 1 is a schematic view of a film wrapping machine with which the present invention may be used.

Referring to FIG. 1, a film-wrapping machine of the type with which the present invention may be used is shown. An article feeding conveyor 1 advances a series of articles 2 to be packaged onto transfer conveyor 3. Conveyor 3 in turn advances the packages 2 to sealing station 5.

Supported over transfer conveyor 3 is a film roll F. The plastic film carried on roll F is a heat-sealable, heat-shrinkable plastic film commercially available from a number of suppliers. It is provided on roll F as a two-ply film, which is formed by folding the film to create a folded side edge for the web. Film is drawn from the roll F to provide film web f, with the folded edge e away from the direction of movement of the articles 2. A conventional turning/folding guide assembly 4 turns the film through 90° to direct it in the same direction of movement as the transfer conveyor 3. At the same time, guide assembly 4 inverts the web layers so that the inner surfaces of the web f as it is drawn from roll F become the outer surfaces, and fold edge e is disposed on the far side of the machine as viewed in FIG. 1.

Guide assembly 4 further spreads apart the layers of the film web f so that transfer conveyor 3 and the articles carried thereon can be directed between the layers of web f.

Web f is advanced by the combination of feed rollers 6, 7, 8 and 9, and an article 2 is advanced by transfer conveyor 3, in a coordinated manner until the web f and the encased article are advanced past the sealing station 5. Movement of the web and article are halted, and a heated cutting/sealing head 10 and a cooperating anvil 11 are moved toward each other until head 10 and anvil 11 contact each other with the film web f disposed therebetween. The head 10 severs the film surrounding the article from the remainder of the incoming web f and seals the transverse cut edge. Additional sealing apparatus (not shown) seals the lateral edge of the web at the near side as viewed in FIG. 1, producing a sealed, loosely-fit film wrapped package 12.

After sealing of the transverse edge is completed, head 10 and anvil 11 are moved apart. The package 12 is advanced by conveyor 14 to carry the package 12 into a heat-shrink tunnel 15 to cause the sealed film to shrink into close-fitting conformance with the article. The completed package 16 is conveyed from tunnel 15.

Figure 2:
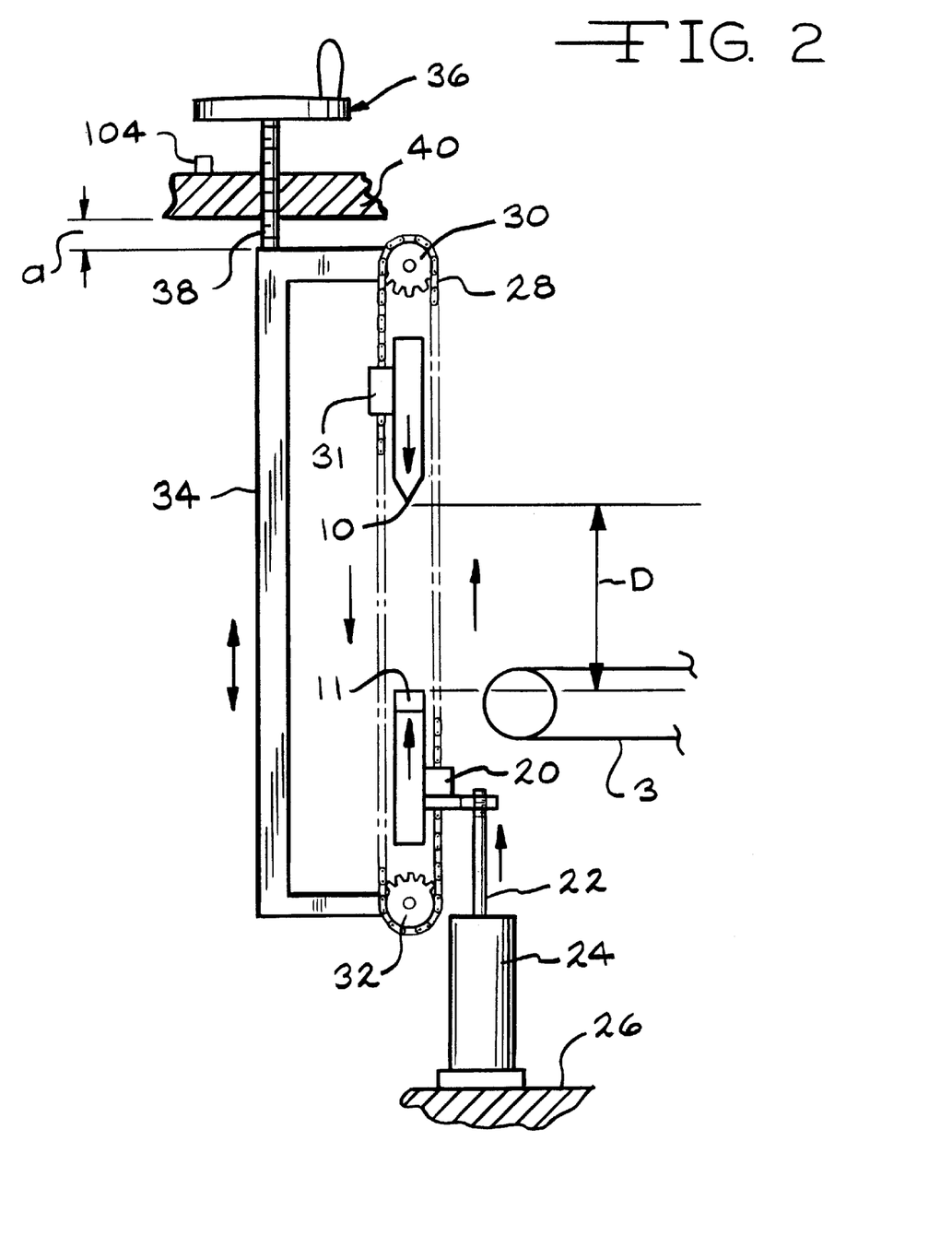
FIG. 2 is a schematic view of the sealing station of the machine of FIG. 1.

Sealing station 5 may be seen schematically in greater detail by reference to FIG. 2. Anvil 11 is mounted on a mounting block 20. Block 20 is connected to the rod 22 of a pneumatic cylinder 24, which is in turn fixed to the machine frame 26. Cylinder rod 22 is shown in its fully retracted position, the result of which is that anvil 11 is shown in its lowermost position. This places the working surface of anvil 11 slightly below the level of the travel path of transfer conveyor 3, so that articles to be packaged may pass freely over anvil 11 when in its lowered position.

The anvil mounting block 20 is also fixedly connected to chain 28, which passes around upper sprocket 30 and lower sprocket 32 to form a vertically-oriented travel path for chain 28. Connected to the opposite side of the travel path for chain 28 is a head mounting block 31, to which cutting/sealing head 10 is mounted. Sprockets 30 and 32 are connected to a sprocket supporting structure 34. Structure 34 is in turn supported by the machine frame through appropriate connections (not shown), but is mounted for vertical movement. As shown schematically in FIG. 2, the means for vertical movement of structure 34 may preferably include a hand crank wheel 36 attached to a screw shaft 38, which is in turn engaged by a threaded connection with the machine frame 40. Actuation of crank wheel 36 causes shaft 38 to rotate within the threaded connection with frame 40, thereby raising or lowering structure 34 as may be desired.

As depicted in FIG. 2, the sealing station is shown in an open position, as is the case when an article and surrounding film is being moved past the sealing station for subsequent severing and sealing. Further, the anvil 11 and cutting/sealing head 10 are shown separated by their maximum separation distance D, used when the article to be packaged is of the maximum height accommodated on the wrapping machine.

After an article is moved beyond the sealing station (to the left as shown in FIG. 2), the web of film (not shown) extends through the sealing station. To sever and seal the web, pneumatic cylinder 24 is actuated, thereby extending cylinder rod 22 to raise anvil 11. Because mounting block 20 is connected to chain 28, the movement of rod 22 also moves chain 28 in a counter-clockwise direction about its path, thereby moving mounting block 31 and lowering head 10. It will be seen that after movement of anvil 11 (and as a result, head 10) through a distance of D/2, head 10 and anvil 11 will meet, severing and sealing the film web. The cylinder 24 is then actuated to withdraw rod 22, returning head 10 and anvil 11 to their initial positions as shown in FIG. 2.

When designing and constructing the wrapping machine, pneumatic cylinder 24 and its rod 22 are selected so that the full stroke of the cylinder is the distance D/2. Thus, in the case of an article of maximum height for the machine (i.e., a height of slightly less than D), the head and anvil meet at the end of the full extension of rod 22.

In general, it is desirable to position the seal between the film layers at approximately the midpoint of the height of the article to be packages for maximum package quality. To adjust the sealing station for articles of less than maximum height, hand crank 36 is used. Upon rotation of hand crank 36, screw shaft 38 operating within the threaded connection with frame 40 moves structure 34 in a downward direction. Because mounting block 20 is fixed through cylinder 24 to frame 26, the movement of structure 34 through an adjustment distance a does not produce any change in vertical position of anvil 11. However, chain 28 will be moved around its travel path by a distance equal to the distance a, so that head 10 advances downwardly by a total distance 2a. Head 10 and anvil 11 are now separated by a distance D−2a, and will meet after actuation of cylinder 24 and extension of rod 22 through a distance of D/2−a, which is less than the full stroke of the cylinder.

An appropriate scale (not shown) is provided in conjunction with hand crank 36, so that an operator of the wrapping machine may adjust the separation distance between head 10 and anvil 11 as appropriate for the article to be packaged.

Figure 3:
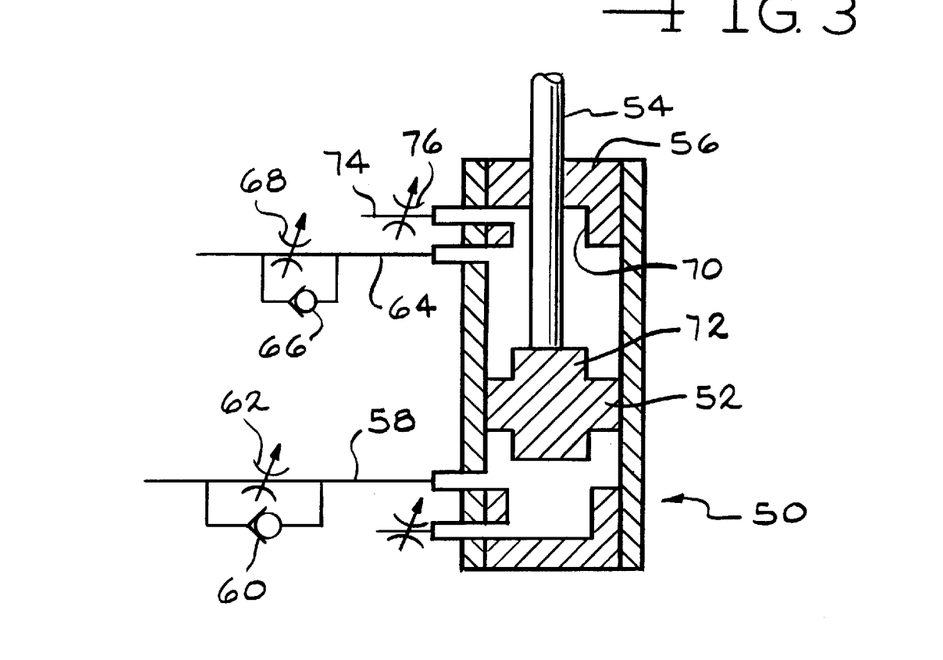
FIG. 3 is a cut-away, schematic view of a conventional pneumatic cylinder and pneumatic control system for use with a film wrapping machine of the type shown in FIG. 1.

Before describing the control system for controlling the actuation of cylinder 24, reference is made to FIG. 3, in which a cut-away view of a conventional pneumatic cylinder 50 is shown. A piston 52 is connected to rod 54, which passes through cylinder end wall 56. An air line 58 is provided for allowing pressurized air through check valve 60 into the cylinder to extend rod 54, and to allow air to exhaust through flow regulator valve 62 as air is directed into the opposite end of the cylinder to retract rod 54 during the opposite piston stroke. A similar air line 64, including inlet check valve 66 and an adjustable outlet flow regulator valve 68 are provided at the opposite end of cylinder 50 on the opposite side of piston 52.

A cavity 70 is formed into end wall 56, and a projection 72 is formed on piston 52 which fits in airtight relationship into cavity 70. An auxiliary (cushion) air exhaust 74 connects the cavity 70 to the outside, with an adjustable flow resistance regulator valve 76 disposed within the auxiliary (cushion) exhaust outlet. Valve 76 is set to provide a greater flow resistance than valve 68.

As piston 52 approaches the upper end of its stroke, projection 72 seals cavity 70. The trapped air within cavity 70 must exhaust through exhaust valve 76. The greater resistance offered by this valve slows the movement of piston 52, thereby cushioning it as it completes its stroke.

A similar cushion is provided at the lower end of cylinder 50.

A cylinder constructed as shown by cylinder 50 in FIG. 3 is used as cylinder 24 in the wrapping machine shown in FIGS. 1 and 2. When the sealing station is set for its maximum height, piston rod 22 will be fully extended when head 10 and anvil 11 meet. Thus, the cushion which is built into the cylinder will cause rod 22 to be slowed in its movement at the end of its stroke. This will in turn slow the movement of head 10 and anvil 11, and will produce a cushioned meeting between the two elements as the cutting and sealing operations are performed on the film web.

Movement of the cylinder rod is also cushioned at the end of its downward stroke to return the sealing station machine to its ready position.

If the sealing station is adjusted for an article of less than maximum height, head 10 and anvil 11 are brought closer together and will meet during cutting and sealing before piston rod 22 has travelled its full stroke. Thus, the cushioning mechanism built into cylinder 24 cannot be used to cushion or slow the movement of the head and anvil just prior to their meeting.

Figure 4:
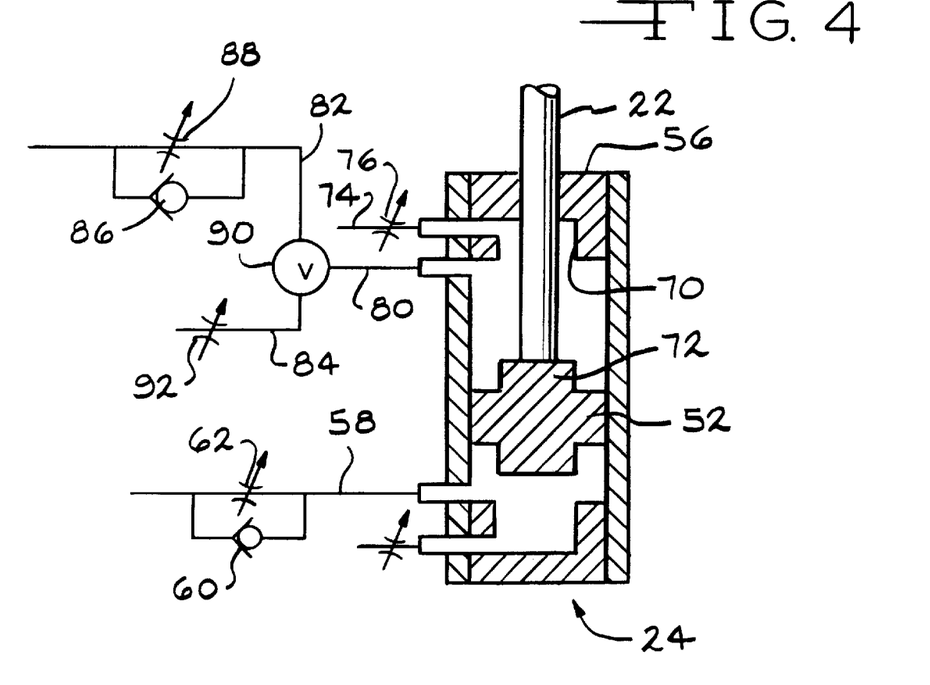
FIG. 4 is a view similar to FIG. 3 showing the control system of the present invention.

Accordingly, cylinder 24 is provided with the pneumatic control system shown schematically in FIG. 4. Parts which correspond to those shown with cylinder 50 in FIG. 3 are identified with identical reference numerals. However, upper air line 64 as shown in FIG. 3 is replaced for cylinder 24 with air line 80, which branches into air lines 82 and 84. Disposed within air line 82 is a compressed air inlet line including check valve 86, and an air exhaust line including flow regulation valve 88. This branch 82 of air line 80 functions in the usual manner similar to air line 64 of FIG. 3.

Located at the point at which air line 80 branches into lines 82 and 84 is an electronically controlled switching valve 90. The valve 90 is used to switch the air exhaust from the upper portion of the cylinder 24 from branch path 82 to branch path 84. Branch path 84 is provided with a flow regulator valve 92 which is adjusted to provide a relatively high flow resistance value similar to that provided by valve 76 disposed in the cushion exhaust 74.

At the beginning of a closing stroke for the sealing station (during which piston direction in FIG. 4 is upward), valve 90 is positioned to exhaust through path 82 so that the piston (and thus sealing head 10 and anvil 11) move at normal speed. However, just prior to sealing contact between the head 10 and anvil 11, valve 90 is actuated to direct exhaust through the branch cushion path 84. The increased resistance to the air exhaust caused by resistance valve 92 slows the piston and sealing head to an appropriate speed for contact.

As has been explained herein, the point at which contact occurs between head 10 and anvil 11 depends upon the initial separation of the head and anvil, which can be adjusted depending upon package size. Thus, valve actuation timing for valve 90 must also be variable to cause the cushioning action to occur just prior to contact between the head and anvil. Therefore, the control system for the sealing station must be capable of recognizing a change of the initial seal head height, as well as provide a means to "measure" such height.

Figure 5:
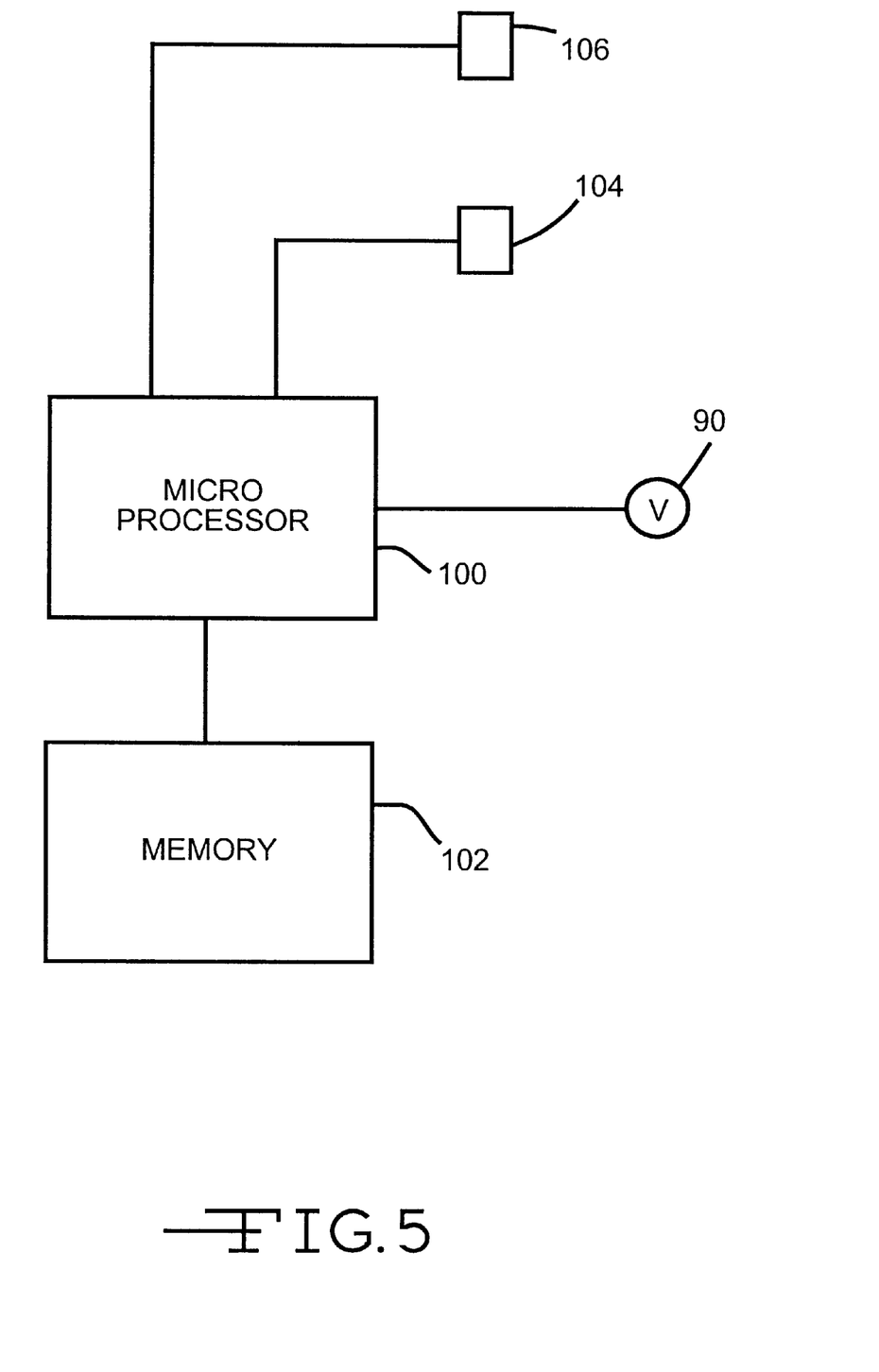
FIG. 5 is a schematic view of a portion of the electronic control system for use with the present invention.

Commercially available sealing machines with which the present invention is intended to be used operate under the control of a microprocessor. The microprocessor is used to control the valve 90 as well. Accordingly, as shown in FIG. 5, microprocessor 100 is provided, communicating with a memory 102. A variety of inputs and outputs (not shown) are provided so that microprocessor 100 can control the general functioning of the wrapping machine in a known manner.

Valve 90 is operatively connected to microprocessor 100 to be controlled thereby. Additionally, a motion sensor 104 is connected to microprocessor 100 and mounted adjacent crank wheel 36 (see FIG. 2). Sensor 104 detects any adjusting movement made by wheel 36, although it does not measure the amount of motion but only that motion has occurred. (Alternatively, a sensor could be provided to detect movement of support structure 34.) A further sensor 106 is connected to microprocessor 100 and provided to detect motion of cutting/sealing head 10 and/or anvil 11. Sensor 106 can thus detect that contact between head and anvil have occurred by determining that movement of either or both head and anvil has stopped.

Figure 6:
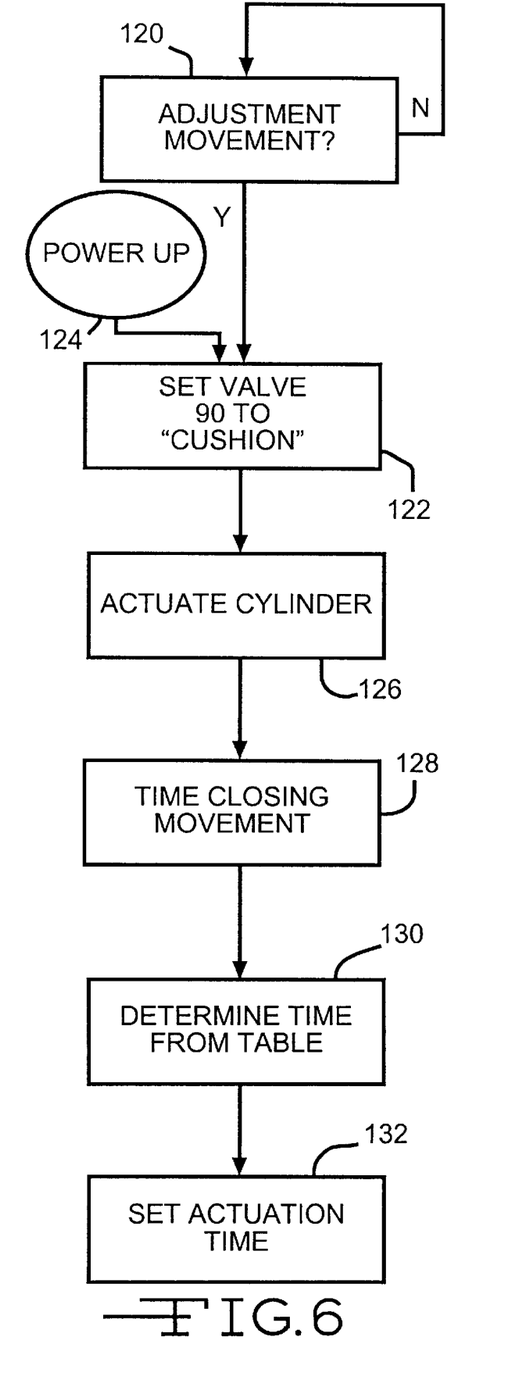
FIG. 6 is a flowchart diagram illustrating the stroke measurement portion of the control system of the present invention.

The measurement operation of the present invention can be seen by reference to the flowchart shown in FIG. 6. In block 120, microprocessor 100 monitors sensor 104 to determine whether any adjusting movement of the crank wheel has occurred. If this is detected, the valve 90 is actuated to direct all exhaust air flow through path 84 and cushion valve 92, shown at block 122. A measurement operation is also carried out upon machine start-up, block 124, and valve 90 is actuated as indicated in block 122.

The cylinder 24 is next actuated to carry out a closing operation for the sealing station, block 126. Because all air flow is through cushion valve 92, the movement of the head and anvil are at the relatively slow "cushion" speed. The end of movement is detected by sensor 106, and the time required to move the head and anvil from their starting positions to a closed position is measured, block 128. This time value is directly related to the distance travelled.

The measured time value is applied against a look-up table stored in memory 102, block 130, to determine an appropriate timing value for actuation of valve 120 during subsequent cycles. This value is used, block 132, to set the actuation time for valve 90 during subsequent, normal-operation cycles.

In the preferred embodiment, the look-up table is created empirically. The sealing head/anvil spacing is adjusted to ¼" increments. For each increment, an appropriate actuation time is determined by trial-and-error and entered into the table.

During the subsequent machine cycles, cylinder 24 is first moved at the higher speed resulting from exhaust through path 82. At the appropriate time (as determined by the actuation time from the look-up table), valve 90 is actuated, thereby slowing the sealing head by directing exhaust through the valve 92 located in branch 84.

A standardized look-up table is used for all machines of the same model. Therefore, the main seal head speed and cushion speed must be standardized. For this reason, a calibration procedure is incorporated into the system, shown in flowchart form in FIG. 7.

Figure 7:
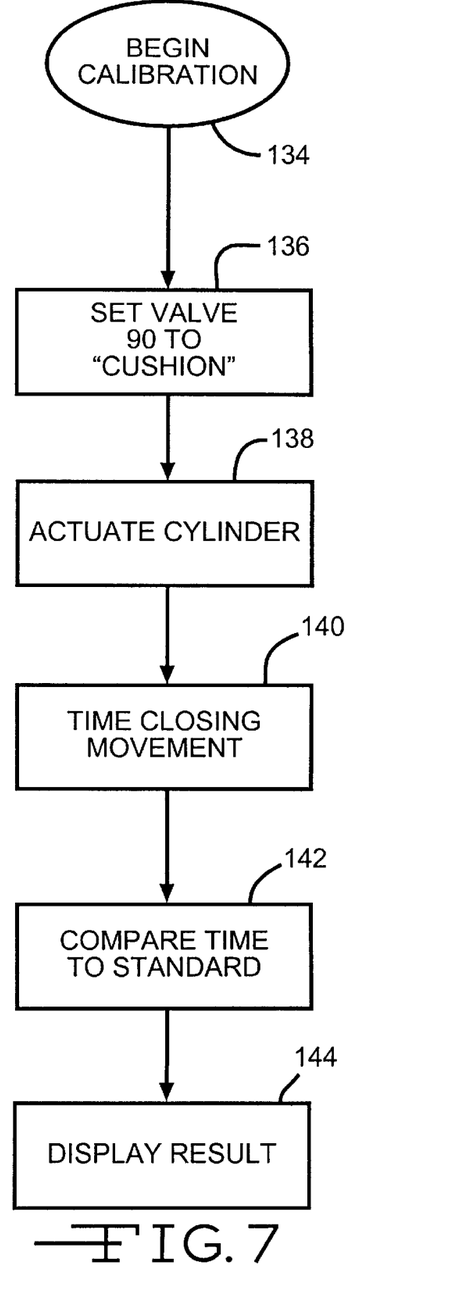
FIG. 7 is a flowchart diagram illustrating the speed calibration portion of the control system of the present invention.

The system is manually placed in calibration mode and the cutting/sealing head and anvil are set to a known separation. The operator initiates a calibration cycle, block 134, and valve 90 is actuated to direct all exhaust during the closing stroke through branch 84 and valve 92, block 136. Cylinder 24 is actuated to close the head and anvil, block 138. The time required to close head 10 and anvil 11 (which corresponds to movement speed) is measured, block 140, and at block 142 compared against a standard time which has been predetermined for the particular model machine. The result of this comparison is provided on a display panel (not shown), block 144, for the information of the operator.

The operator then manually adjusts valve 92 to increase or decrease the resistance to air flow through branch 84, thereby increasing or decreasing the movement speed of the piston 52 within cylinder 24. The calibration cycle is repeated and the result is again displayed. The operator continues through successive iterations until the difference between actual stroke time and standard stroke time is rendered either zero or acceptably small.

A similar calibration may be performed for the high-speed, normal piston movement by using the full stroke of piston 52 so that the mechanical cushion built into the cylinder may be used. Valve 90 is left deactivated in such a case, and movement time is compared against a standard. Valve 88 may be adjusted following each calibration cycle until the difference between actual stroke time and standard stroke time becomes either zero or acceptably small.

What is claimed is:

1. In a machine for wrapping an article in plastic film, including a sealing station having a sealing head and a corresponding anvil, and means for moving said head and anvil from an initial separated position to a contact position and back to said initial position, said moving means including a pneumatic cylinder having an initial state in which said head and anvil are in said initial position and an actuated state in which said head and anvil are in said contact position, said cylinder having an air exhaust outlet line for exhausting air from said cylinder during operation of said cylinder from said initial state to said actuated state, the improvement comprising:

adjustment means for adjusting said initial position to change the distance between said head and said anvil while said cylinder is in said initial state;

a selectively actuatable valve disposed in said outlet line for selectively directing exhausting air through a first path including relatively low airflow resistance and a second path including relatively high airflow resistance; and means for controlling said valve to direct exhaust air flow from said first path into said second path during operation of said cylinder and just prior to said cylinder being placed in said actuated state to move said head and anvil into mutual contact to cushion said contact therebetween.

2. A machine as claimed in claim 1, wherein said means for controlling said valve includes a microprocessor programmed to control said valve to direct exhaust air flow from said first path into said second path just prior to said mutual contact between said head and said anvil.

3. A machine as claimed in claim 2, wherein said microprocessor controls said valve to direct exhaust air flow from said first path into said second path after a predetermined time interval during operation of said cylinder.

4. A machine as claimed in claim 3, further comprising a memory for storing said predetermined time interval, and wherein said microprocessor reads said predetermined time interval from said memory.

5. A machine as claimed in claim 4, wherein said memory stores a plurality of said predetermined time intervals, and wherein said microprocessor reads an appropriate one of said predetermined time intervals as a function of distance between said head and said anvil when said cylinder is in said initial state.

6. A method for controlling a machine for wrapping an article in plastic film, the machine including a sealing station having a sealing head and a corresponding anvil, and means for moving said head and anvil from an initial separated position to a contact position and back to said initial position, said moving means including a pneumatic cylinder having an initial state in which said head and anvil are in said initial position and an actuated state in which said head and anvil are in said contact position, said cylinder having an air exhaust outlet line for exhausting air from said cylinder during operation of said cylinder from said initial state to said actuated state, and a selectively actuatable valve disposed in said outlet line for selectively directing exhausting air through a first path including relatively low airflow resistance and a second path including relatively high airflow resistance, the method comprising the steps of:

operating said cylinder to move from said initial state into said actuated state; and controlling said valve to direct exhaust air flow from said first path into said second path during operation of said cylinder just prior to said cylinder being placed in said actuated state to cushion contact between said head and said anvil.

7. A method as claimed in claim 6, wherein said valve is controlled to direct exhaust air flow from said first path into said second path after a predetermined time interval during operation of said cylinder.

8. A method for controlling a machine for wrapping an article in plastic film, the machine including a sealing station having a sealing head and a corresponding anvil, and means for moving said head and anvil from an initial separated position to a contact position and back to said initial position, said moving means including a pneumatic cylinder having an initial state in which said head and anvil are in said initial position and an actuated state in which said head and anvil are in said contact position, said cylinder having an air exhaust outlet line for exhausting air from said cylinder during operation of said cylinder from said initial state to said actuated state, and a selectively actuatable valve disposed in said outlet line for selectively directing exhausting air through a first path including relatively low airflow resistance and a second path including relatively high airflow resistance, the method comprising the steps of:

adjusting said initial position to move said head and said anvil to change the distance therebetween while said cylinder is in said initial state;

operating said cylinder to move from said initial state into said actuated state; and controlling said valve to direct exhaust air flow from said first path into said second path during operation of said cylinder just prior to said cylinder being placed in said actuated state to cushion contact between said head and said anvil.

9. A method as claimed in claim 8, wherein said valve is controlled to direct exhaust air flow from said first path into said second path after a predetermined time interval during operation of said cylinder.

10. A method as claimed in claim 9, wherein said machine includes a memory for storing said predetermined time interval, and wherein said predetermined time interval is read from said memory.

11. A machine as claimed in claim 10, wherein said memory stores a plurality of said predetermined time intervals, and wherein an appropriate one of said predetermined time intervals is read as a function of distance between said head and said anvil when said cylinder is in said initial state.

12. A machine as claimed in claim 11, wherein following adjusting of said initial position, the distance between said head and said anvil is determined by controlling said valve to direct exhaust air flow from said first path into said second path, thereafter operating said cylinder from said initial state to said actuated state to cause contact between said head and said anvil, and measuring the time required for said operation of said cylinder.

* * * * *